United States Patent
Ji et al.

(10) Patent No.: US 11,638,031 B2
(45) Date of Patent: Apr. 25, 2023

(54) MOTION COMPENSATION METHOD AND MODULE, CHIP, ELECTRONIC DEVICE AND STORAGE MEDIA

(71) Applicant: AMLOGIC (SHANGHAI) CO., LTD, Shanghai (CN)

(72) Inventors: Tao Ji, Shanghai (CN); Zhihong He, Shanghai (CN); Chun Wang, Shanghai (CN); Dongjian Wang, Shanghai (CN); Xuyun Chen, Shanghai (CN)

(73) Assignee: Amlogic (Shanghai) Co., Ltd., Shanghai (CN)

( * ) Notice: Subject to any disclaimer, the term of this patent is extended or adjusted under 35 U.S.C. 154(b) by 5 days.

(21) Appl. No.: 17/304,920

(22) Filed: Jun. 28, 2021

(65) Prior Publication Data

US 2021/0409577 A1 Dec. 30, 2021

(30) Foreign Application Priority Data

Jun. 30, 2020 (CN) .......................... 202010613538.5

(51) Int. Cl.
| | | |
|---|---|---|
| *H04N 19/55* | (2014.01) | |
| *H04N 19/139* | (2014.01) | |
| *H04N 19/176* | (2014.01) | |
| *H04N 19/543* | (2014.01) | |
| *H04N 19/513* | (2014.01) | |
| *H04N 19/527* | (2014.01) | |
| *H04N 19/533* | (2014.01) | |
| *H04N 5/14* | (2006.01) | |
| *H04N 5/21* | (2006.01) | |
| *H04N 19/23* | (2014.01) | |
| *H04N 19/52* | (2014.01) | |
| *H04N 19/517* | (2014.01) | |

(52) U.S. Cl.
CPC .......... *H04N 19/55* (2014.11); *H04N 19/139* (2014.11); *H04N 19/176* (2014.11); *H04N 19/513* (2014.11); *H04N 19/521* (2014.11); *H04N 19/527* (2014.11); *H04N 19/533* (2014.11); *H04N 19/543* (2014.11); *H04N 5/145* (2013.01); *H04N 5/21* (2013.01); *H04N 19/23* (2014.11); *H04N 19/517* (2014.11); *H04N 19/52* (2014.11)

(58) Field of Classification Search
CPC ............................ H04N 19/55; H04N 19/533
See application file for complete search history.

(56) References Cited

U.S. PATENT DOCUMENTS

2014/0327819 A1 11/2014 Wu

OTHER PUBLICATIONS

EPO, European Search Opinion for EP 21182592.2 (dated Dec. 1, 2021) (Year: 2021).*
Byeong-Doo Choi et al, "Motion-Compensated Frame Interpolation Using Bilateral Motion Estimation and Adaptive Overlapped Block Motion Compensation", IEEE Transactions on Circuits and Systems for Video Technology, IEEE, USA, vol. 16, No. 4, Apr. 1, 2007 (Apr. 1, 2007), pp. 407-416, XP01179771, ISSN: 1051-8215.

(Continued)

*Primary Examiner* — David N Werner
(74) *Attorney, Agent, or Firm* — Lorenz & Kopf, LLP

(57) ABSTRACT

The present disclosure relates to a motion compensation method and module, a chip, an electronic device, and a storage medium, to improve the problem of haloes easily appearing on the edges of moving objects.

17 Claims, 7 Drawing Sheets

(56) References Cited

OTHER PUBLICATIONS

Salih Dikbas et al, "Novel True-Motion Estimation Algorithm and Its Application to Motion-Compensated Temporal Frame Interpolation.", IEEE Transactions on Image Processing, IEEE, USA, vol. 22, No. 8, Aug. 1, 2013 (Aug. 1, 2013), pp. 2931-2945, XP011511169, ISSN: 1057-7149, DOI: 10.1109/TIP.2012.2222893.

* cited by examiner

MOTION COMPENSATION METHOD AND MODULE, CHIP, ELECTRONIC DEVICE AND STORAGE MEDIA

CROSS-REFERENCE TO RELATED APPLICATION

This application claims priority to Chinese Patent Application No. 202010613538.5, filed Jun. 30, 2020, which is incorporated in its entirety by reference.

TECHNICAL FIELD

The present disclosure relates to the technical field of video image processing, and in particular, to a motion compensation method and module, a chip, an electronic device, and storage media.

BACKGROUND

Video frame rate is a measure of the number of frames played on a display device in one second. Generally, in the case of the playing frame rate of 60 frames of pictures per second, the human eye will feel the video is more realistic and smoother. In practical applications, the human eye can feel jitter and blur when video resources with low frame rates are played on display devices. In order to solve the video jitter and blur effect caused by low frame rate, the subjective visual effect of video images can be improved by increasing the video frame rate technique.

The video frame rate conversion includes the steps of Motion Estimation (ME), The basic idea of motion estimation is to divide each frame of the image sequence into many non-overlapping blocks (blocks), and consider the displacement of all pixels within a block to be the same, and obtain the block that is most like the current block based on certain marching criteria as a matching block. The relative displacement of the matching block and the current block is the motion vector.

After motion estimation, motion compensation (MC) is also performed. Motion compensation is the process of interpolating the pixel values of the previous frame and the current frame to obtain the pixel values of the frame to be interpolated, based on the motion vector obtained from the motion estimation.

However, there is a halo (halo) effect in video frames with moving objects, as shown in FIG. 1 where the first grid area 1 at the edge of the moving portrait appears significantly broken compared to the second grid area 2 without moving objects. In some other video frames with halo effect, there is also blurring of the edges of moving objects.

SUMMARY

The present disclosure provides a motion compensation method and module, a chip, an electronic device, and a storage medium, to improve the problem of haloes easily appearing on the edges of moving objects.

In some embodiments, a motion compensation method includes: determining whether a current block is located at a junction of a foreground and a background; in response to a determination that the current block is located at the junction of the foreground and the background, marking the current block as a target block, a motion vector of the target block being a basic motion vector; obtaining a first set of motion vectors based on differences between motion vectors of a first central block of the target block pointing to a previous frame within a search range and the basic motion vector, obtaining a second set of motion vectors based on differences between motion vectors of a second central block of the target block pointing to a current frame within a search range and the basic motion vector; clustering the first set of motion vectors and the second set of motion vectors to obtain an additional motion vector of the target block; and obtaining a pixel value of the target block based on the basic motion vector and the additional motion vector.

The embodiment of the present disclosure provides a motion compensation method, which obtains motion vectors with large differences from the base motion vectors for the target blocks located at the background and foreground positions, and obtain an additional motion vector by clustering. Since the motion vectors of the background and the foreground in the junction area have large differences, the additional motion vector and the basic motion vector obtained based on the large difference can represent the background(or foreground) motion vector and foreground (or background) motion vector respectively, so that the pixel values obtained based on the additional motion vector and the basic motion vector, combined with the information of background and foreground, can more truly reflect the actual image pixel values, thus improving the problem that the edges of moving objects are prone to halo.

In some embodiments, a motion compensation module, comprising: a judgment unit, configured to determine whether a current block is located at a junction of a foreground and a background; an extraction unit, configured to mark the current block as a target block, a motion vector of the target block being a basic motion vector, in response to a determination that the current block is located at the junction of the foreground and the background; a calculation unit, configured to obtain a first set of motion vectors based on differences between motion vectors of a first central block of the target block pointing to a previous frame within a search range and the basic motion vector and obtain a second set of motion vectors based on differences between motion vectors of a second central block of the target block pointing to a current frame within a search range and the basic motion vector; a clustering unit, configured to cluster the first set of motion vectors and the second set of motion vectors to obtain an additional motion vector of the target block; and an interpolation unit, configured to obtain a pixel value of the target block based on the basic motion vector and the additional motion vector.

In some embodiments, a chip includes a motion compensation module provided by the present disclosure.

In some embodiments, an electronic device, which includes a chip provided by the present disclosure.

In some embodiments, A storage medium, which stores one or more computer instructions, is configured to implement the motion compensation method provided by the present disclosure.

BRIEF DESCRIPTION OF THE DRAWINGS

The accompanying drawings, which comprise a part of this specification, illustrate several embodiments and, together with the description, serve to explain the principles and features of the disclosed embodiments, in the drawings.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses, systems, and methods consistent with aspects related to the disclosure as recited in the appended claims.

From the background technology, it is known that there is a halo effect in the current video frames with moving objects. The following is an analysis of the causes of halos in conjunction with the images of adjacent frames.

Figure 1:
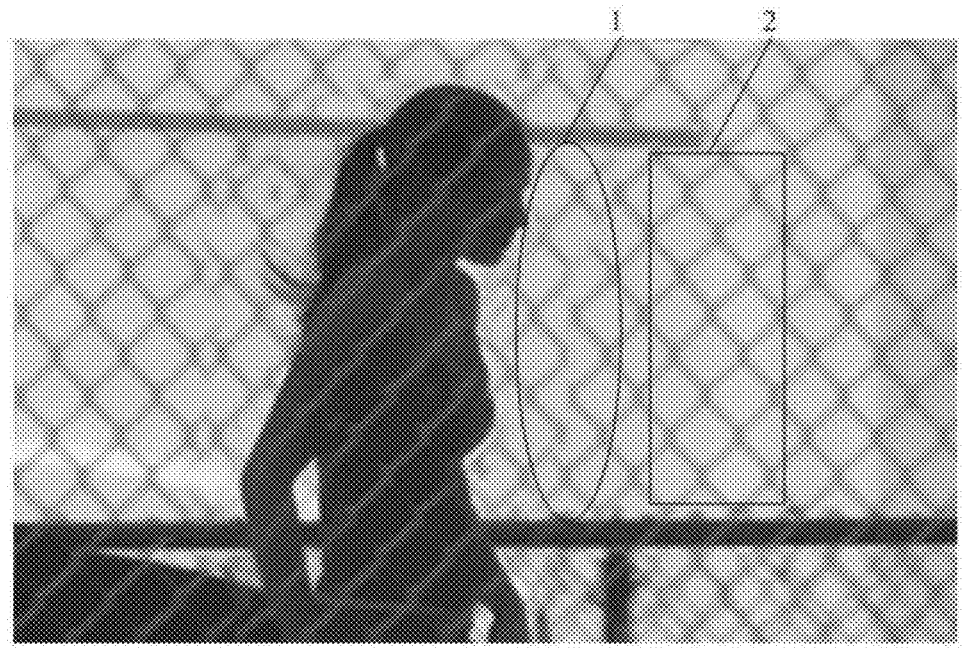
FIG. 1 is a schematic diagram of a halo effect.
Figure 2:
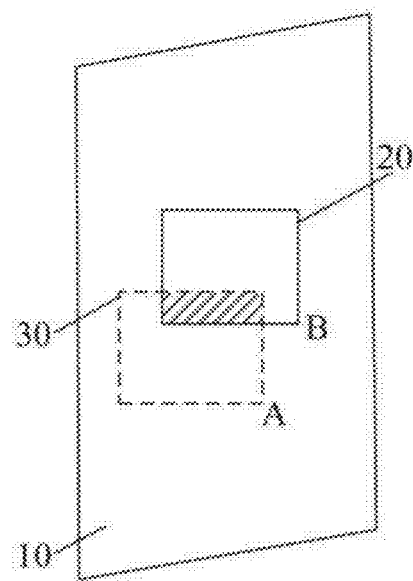
FIG. 2 is a position relationship diagram of a moving object in an adjacent frame.

FIG. 2 is a diagram of a position relationship diagram of a moving object in an adjacent frame, and is a schematic diagram of overlapping a previous frame and a current frame together. The box in the figure is offset from position A of background 10 to position B, solid block 20 represents the position of the moving object in the foreground of the current frame, and the solid line box 20 excluding the shaded area is the area covered by the foreground of the moving object, the dashed box 30 represents the position of the moving object m the foreground of the previous frame, the dashed box 30 excluding the shaded area is the area where the background is exposed after the foreground of the moving object passes by.

Figure 3:
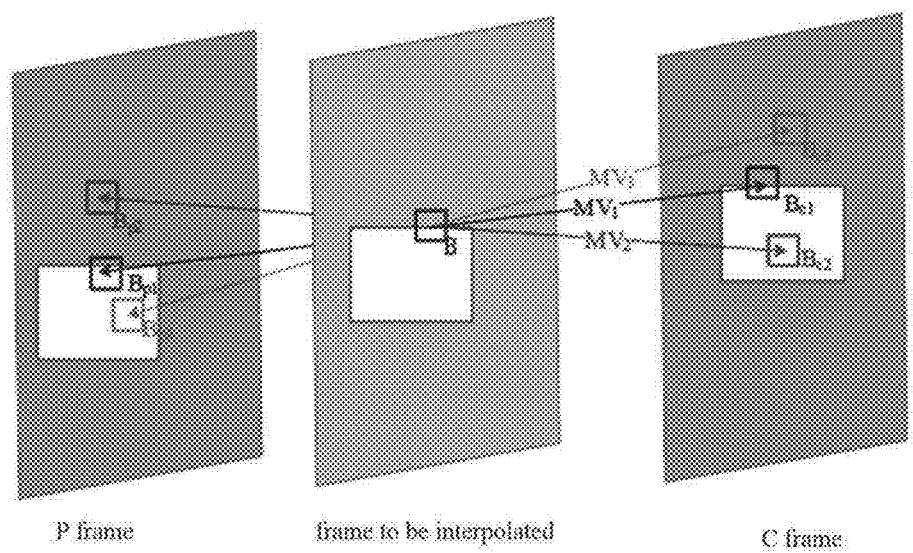
FIG. 3 is a schematic diagram of adjacent frame motion vectors.

The solid line box 20 and the dashed line box 30 are located at the junction area of the motion foreground and background. When performing motion estimation based on blocks, one block has only one motion vector. And as shown in FIG. 3 the adjacent frame motion vector, for block B in the junction area, the motion vector of the foreground is $MV_{B1}$ and the motion vector of the background is $MV_{B2}$, which have large differences, therefore, when performing motion compensation based on one basic motion vector $MV_B$, the basic motion vector $MV_B$ is either a foreground motion vector or a background motion vector, the pixel value obtained through the basic motion vector $MV_B$ interpolation operation is difficult to truly reflect the pixel value of the actual image, this results in a halo effect where the image is broken or blurred.

In order to solve the described technical problems, the embodiment of the present disclosure provides a motion compensation method, which obtains motion vectors with large differences from the base motion vectors for the target blocks located at the background and foreground positions, and obtain an additional motion vector by clustering. Since the motion vectors of the background and the foreground in the junction area have large differences, the additional motion vector and the basic motion vector obtained based on the large difference can represent the background(or foreground) motion vector and foreground(or background) motion vector respectively, so that the pixel values obtained based on the additional motion vector and the basic motion vector, combined with the information of background and foreground, can more truly reflect the actual image pixel values, thus improving the problem that the edges of moving objects are prone to halo.

Figure 4:
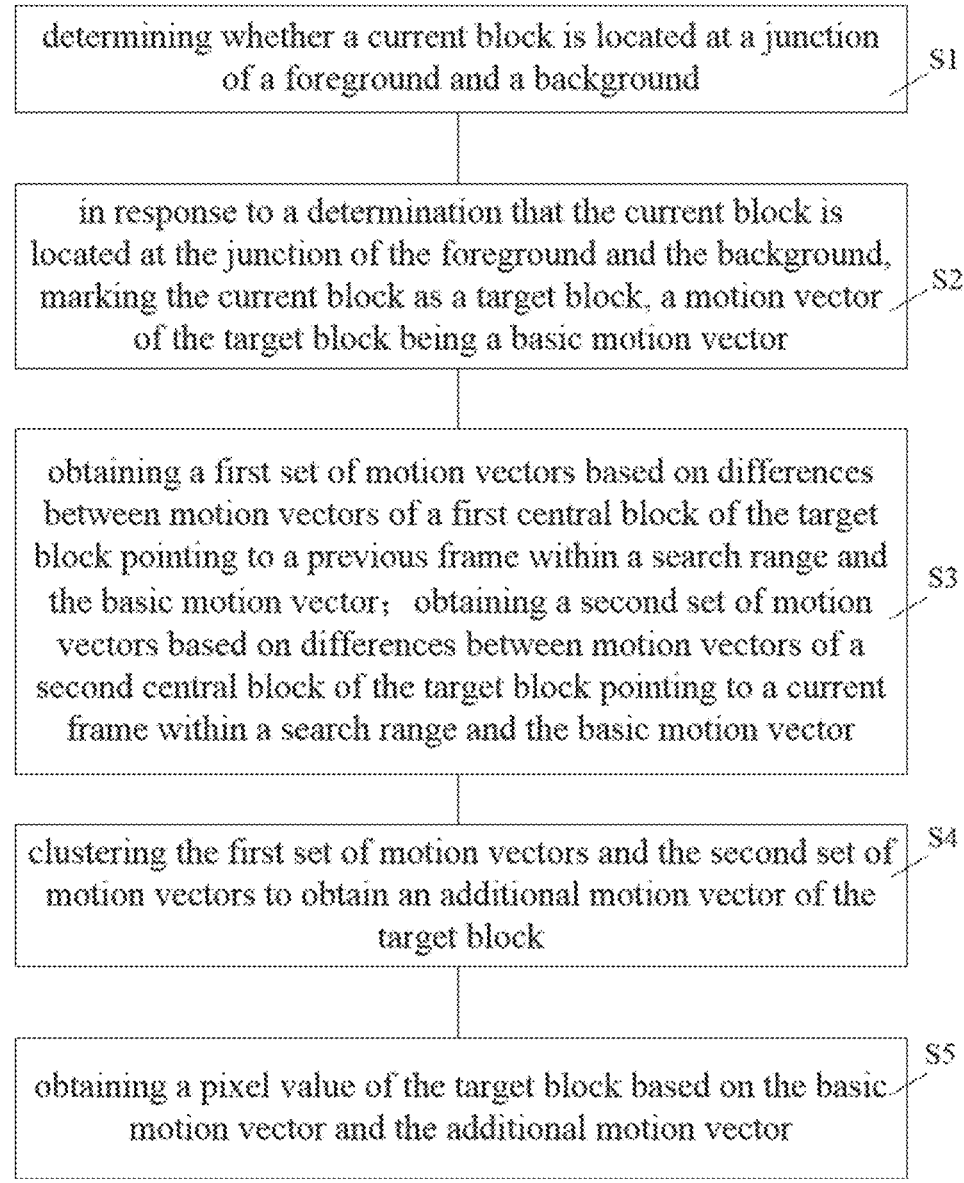
FIG. 4 is a flow diagram of a motion compensation method based on an embodiment of the present disclosure.

Referring to FIG. 4, which is a flow diagram of a motion compensation method based on an embodiment of the present disclosure. After the motion estimation step, the motion compensation method performs interpolation operation on a motion vector obtained by motion estimation to obtain a pixel value of a to-be-interpolated frame. This embodiment motion compensation method includes:

Step S1, determining whether a current block is located at a junction of a foreground and a background;

Step S2, in response to a determination that the current block is located at the junction of the foreground and the background, marking the current block as a target block, a motion vector of the target block being a basic motion vector;

Step S3, obtaining a first set of motion vectors based on the difference between the motion vectors of a first central block of the target block pointing to the previous frame within a search range and the basic motion vector, obtaining a second set of motion vectors according the difference between the motion vectors of a second central block of the target block pointing to the current frame within a search range and the basic motion vector;

Step S4, clustering the first set of motion vectors and the second set of motion vectors to obtain an additional motion vector of the target block;

Step S5, obtaining a pixel value of the target block based on the basic motion vector and the additional motion vector.

In order to make the above purposes, features and advantages of the embodiments of the present disclosure more comprehensible, a detailed description of specific embodiments of the present disclosure is provided below in conjunction with the accompanying drawings.

Executing step S1, determining whether a current block is located at a junction of a foreground and a background.

It should be noted that the direction of movement of all pixels in a block located in the foreground or background area remains the same, therefore the blocks which are completely located in the foreground region or completely located in the background region also maintains the same motion vector as its neighboring surrounding blocks. A block located at a junction position of a foreground region or a background region, the motion vector in which includes the foreground motion vector and the background motion vector therefore the surrounding blocks adjacent to the blocks located at a junction position of a foreground region or a background region, have different motion vectors. For example, some of the surrounding blocks am background motion vectors; other blocks are foreground motion vectors with large differences. Based on this feature, Step S1 may include the following sub-steps:

Step S11, obtaining a motion vector of the current block.

Specifically, the current block refers to the block that needs to be determined in a frame to be interpolated, and the motion vector refers to the motion vector of a previous frame (P frame) to a current frame (C frame). Motion estimation is performed before motion compensation is performed, a video chip may include a motion estimation module for providing motion vectors, from which the motion vector described can be obtained in practical applications.

Step S12, determining whether motion vectors of surrounding blocks centered on the current block am the same as the motion vector of the current block.

In practical application, the current block can be taken as the center, and the motion vectors in the range of 3×3 can be analyzed. Specifically, there are 9 blocks in the range of 3×3, the motion vector of the current block can be taken as a reference, differences between the motion vectors of the surrounding 8 blocks and the motion vector of the current block can be determined.

S13, in response to a determination that a motion vector of a surrounding block is different from the motion vector of the current block, determining that the current block is located at the junction of foreground and background.

For example, if 5 of the 8 surrounding blocks have the same motion vector as the current block, and 3 blocks have a different motion vector than the current block, it means that these 3 blocks and the current block are in different background or foreground region. It is determined that the current block is located at a junction of the background and foreground, and the pixels in the current block have multiple motion vectors.

And if the motion vector of the surrounding block is consistent with the motion vector of the current block, it means that the current block is in a relatively flat region with little change, it can be determined that the current block is completely located in the foreground region or completely located in the background region.

Executing step S2, in response to a determination that the current block is located at the junction of the foreground and the background, marking the current block as a target block, a motion vector of the target block being a basic motion vector.

This step is used for marking the block located at the junction as a target block based on the step S1 to perform the motion compensation. And mark the motion vector of P frame to C frame of the target block as a basic motion vector, which serves as a reference for performing follow-up motion vector comparison.

Executing step S3, obtaining a first set of motion vectors based on differences between motion vectors of a first central block of the target block pointing to a previous frame within a search range and the basic motion vector, obtaining a second set of motion vectors based on differences between motion vectors of a second central block of the target block pointing to a current frame within a search range and the basic motion vector.

The process of obtaining a first set of motion vectors described above is illustrated with reference to FIG. 5, which shows a schematic representation of each motion vector of the target block to be interpolated in a search range pointing to the previous frame.

Figure 5:
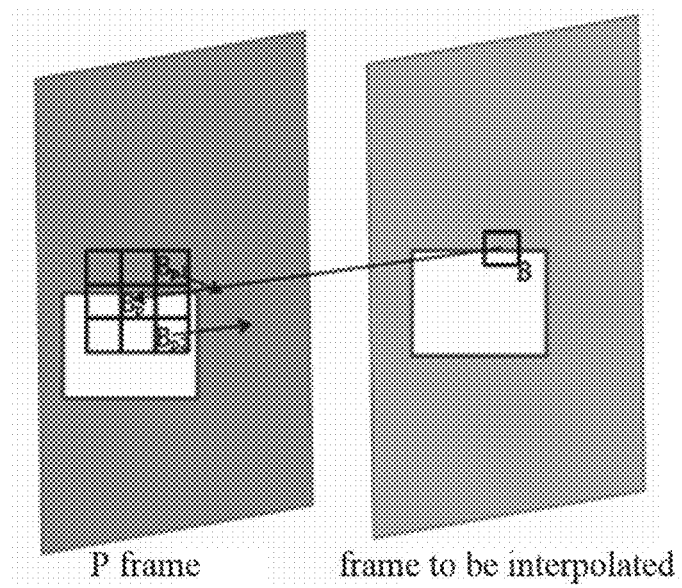
FIG. 5 is a schematic representation of step S3 in FIG. 4.

In the FIG. 5, the target block B of the frame to be interpolated corresponds to the first central block $B_p$ in P frame based on the basic motion vector $MV_B$, and the target block B is located at the junction of background and foreground, accordingly, the first central block $B_p$ in P frame is also located at the junction of the background and foreground. The differences between the motion vectors of the 8 first surrounding blocks $B_{p1}$, $B_{p2}$ ... and the basic motion vector are shown herewith the first central block as the center in a search range of 3×3.

Specifically, the motion vectors of the 8 first surrounding blocks ($B_{p1}$, $B_{p2}$ ... ) around the first central block $B_p$ can be obtained, and whether the difference between the motion vector of surrounding 8 first surrounding blocks and the basic motion vector $MV_B$ is greater than a first predetermined threshold could be determined. In response to a determination that the difference is greater than the first predetermined threshold, the motion vectors of the first surrounding blocks are grouped into the first set of motion vectors.

Specifically, the process of obtaining the first set of motion vectors can be expressed by following Equation 1:

$$MV'_p = \left\{ MV \mid MV_p(row_p + i_p, col_p + j_p) - MV_B > thrd, i_p, j_p \in \left[-\frac{w}{2}, \frac{w}{2}\right] \right\}$$

wherein, $MV'_p$ represents each motion vector in the first set of motion vectors, w×w represents the search range, ($row_p$, $col_p$) represents position of the first central block in the previous frame, $i_p$ and $j_p$ represents the offset position of the first surrounding block relative to the first central block, $MV_B$ represents the basic motion vector, thrd represents the first predetermined threshold.

It should also be noted that because the motion vector is directional, projected onto the XY coordinate system in the plane of the P frame, the difference between $MV_p$ and $MV_B$ can actually be expressed as abs $(MV_{px}-MV_{Bx})$+abs $(MV_{py}-MV_{By})$, wherein abs means absolute value.

Similar to the method of searching and determining in P frames, the target block B corresponds to the second central block $B_e$ in C frame based on the basic motion vector $MV_B$, and the target block B is located at a junction of a background and a foreground, accordingly, the second central $B_e$ in C frame is also located at the junction of the background and foreground. For example, the second central block $B_e$ can be taken as the center in a search range of 3×3, the differences between the motion vectors of the 8 second surrounding blocks and the basic motion vector can be obtained.

Specifically, the motion vectors of 8 second surrounding blocks around the second central block $B_e$ can be obtained. Accordingly, the difference between the surrounding 8 motion vector and the basic motion vector $MV_B$ can be obtained. In response to a determination that the difference is greater than the first predetermined threshold, the motion vectors of the second surrounding blocks are grouped into the second set of motion vectors.

Specifically, the process of obtaining the second set of motion vectors can be expressed by Equation 2

$$MV'_c = \left\{ MV \mid MV_c(row_c + i_c, col_c + j_c) - MV_B > thrd, i_c, j_c \in \left[-\frac{w}{2}, \frac{w}{2}\right] \right\}$$

wherein, $MV'_e$ represents each motion vector in the second set of motion vectors, ($row_e$, $col_e$) represents position of the second central block in the current frame, $i_e$ and $j_e$ represents the offset position of the second surrounding block relative to the second central block.

It should also be noted that because the motion vector is directional, projected onto the XY coordinate system in the plane of the C frame, the difference between $MV_e$ and $MV_B$ can actually be expressed as abs $(MV_{ex}-MV_{Bx})$+abs $(MV_{ey}-MV_{By})$, wherein abs means absolute value.

It should be noted that FIG. 5 shows an example of a search in a 3×3 range; accordingly, the w of the search range in the Equation 1 and Equation 2 is set to 3, and the value of $i_p$ and $j_p$ is taken in the range of 1, 0 and +1, after taken as an integer in other embodiments, it is also possible to set the value of the w based on the size of the block, and the requirements of accuracy, for example, the w can also be set to 5, 7, etc.

The embodiment of the present disclosure selects the motion vectors that are significantly different from the basic motion vector by comparing them with the first predetermined threshold. The motion vectors selected and the basic motion vector represents the background motion vector and the foreground motion vector, respectively.

It should be noted that if the first predetermined threshold is too small, it is difficult to distinguish between background motion vectors and foreground motion vectors, and if the first preset threshold is too large, fewer motion vectors will be selected, which is not favorable for subsequent interpolation to obtain pixel values using a mean or a median algorithm. Thus, in this embodiment, the first predetermined threshold within the range of one-third of the basic motion vector to two-thirds of the basic motion vector.

In combination with reference to FIG. 4, executing Step S4, clustering the first set of motion vectors and the second set of motion vectors to obtain an additional motion vector of the target block.

The additional motion vectors can be obtained by clustering the motion vectors of the first set of motion vectors $MV'_p$ and the motion vectors the second set of motion vectors $MV'_e$, and the first set of motion vectors and the second set of motion vectors include the motion vectors which have larger differences with the basic motion vector, therefore, the additional motion vector is a typical motion vector with a larger difference from a basic motion vector. By making the blocks at the junction of foreground and background have multiple motion vectors (for example, basic motion vectors and additional motion vectors), it is possible to reflect the different motions of foreground pixels and background pixels.

In addition, the motion compensation method of this present disclosure can obtain the motion vector with the larger difference from the basic motion vector in the step S3, and obtains typical motion vectors as representatives for subsequent pixel value calculation through clustering processing, which can reduce the computational volume of data processing and improve the response speed of video image processing.

Specifically, first, the motion vectors in the first set of motion vectors and the second set of motion vectors am divided into a plurality of groups based on the variability of the motion vectors. A mean or a median value of the motion vectors in each group is used as the additional motion vector.

For example, the first set of motion vectors and the second set of motion vectors have multiple motion vectors. Any motion vector can be taken as an initial motion vector of a first group. And the difference between the other motion vector and the initial motion vector can be obtained, if the difference is larger, the other motion vector will be grouped into a new group; if the difference is smaller, the other motion vector will be grouped into the same group as the initial motion vector. And so on, after polling the motion vectors in the two sets of motion vectors once, motion vector grouping is realized. Wherein, the difference can beset based on empirical values.

After grouping, if there is only one motion vector in a group, the motion vector is taken as the additional motion vector; if there are multiple motion vectors in a group, a mean or a median of the multiple motion vectors is used as the additional motion vector.

Specifically, the process of obtaining the additional motion vectors by averaging can be expressed by the following Equation 3.

$$MV_1 = \left(\sum_{k=1}^{m_1} \Omega_1\right) \bigg/ m_1$$

$$MV_2 = \left(\sum_{k=1}^{m_2} \Omega_2\right) \bigg/ m_2$$

$$MV_n = \left(\sum_{k=1}^{m_n} \Omega_1\right) \bigg/ m_n$$

$$\{\Omega_1 \cup \Omega_2 \wedge \Omega_n\} = \{MV'_p \cup MV'_e\}$$

Equation 3 wherein a represents the number of groups after grouping, m represents the number of motion vectors in the ith group after grouping ((i is in the range of 1 to n), Σ represents summation of motion vectors, wherein $\Omega_1, \Omega_2, \ldots, \Omega_n$ represents the set of motion vectors of each group respectively.

In other embodiments, an intermediate value of the motion vector in any group can also be taken as an additional motion vector, i.e., the additional motion vector is obtained by the median value.

Figure 6:
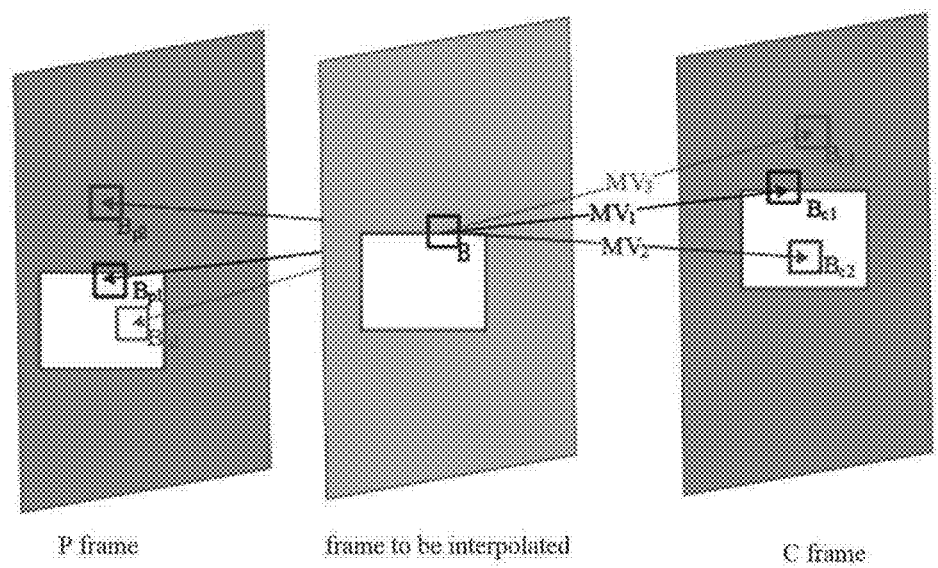
FIG. 6 is a schematic representation of step S5 in FIG. 4.

In conjunction with reference to FIG. 6, executing Step S5, obtaining a pixel value of the target block based on the basic motion vector and the additional motion vector.

Based on the basic motion vector obtained from the motion estimation, an additional motion vector to the block located at the junction of foreground and background can be added to represent a motion vector different from the basic motion vector, and the pixel values of the frames to be interpolated, which can be obtained by interpolating a block with multiple motion vectors, can provide a more realistic image reproduction.

It should be noted that the process of the interpolation algorithm of the embodiment of the disclosure is based on the feature that the pixel values of the same pixels in adjacent frames are correlated.

Specifically, the step of obtaining the pixel value of the target block based on the basic motion vector and the additional motion vector includes: the pixel value of the basic motion vector in the previous frame can be taken as a first basic pixel value, and the pixel value of the basic motion vector in the current frame can be taken as a second basic pixel value; the pixel values of the additional motion vector in the previous frame and the current frame can be obtained as reference pixel values. The pixel value of the target block can be obtained based on the pixel value of the reference pixel value that has a correlation with the basic pixel value.

Accordingly, obtaining the pixel value of the target block based on the pixel value of the reference pixel values that has a correlation with the basic pixel value includes: for each reference pixel value, calculating a first difference between the reference pixel value and the first basic pixel value, and calculating a second difference between the reference pixel value and the second basic pixel value, calculating a sum of the first difference and second difference as a deviation amount; determining whether the deviation amount corresponding to the reference pixel value is less than a second predetermined threshold; in response to the deviation amount being less than the second predetermined threshold, taking the reference pixel value as a target pixel value, for each additional motion vector, taking the a mean the target pixel or a median value of the target pixel values as the pixel value of the target block.

In combination with reference to FIG. 6, the process of obtaining pixel values is illustrated. As shown in FIG. 6, in this embodiment. 3 additional motion vectors can be obtained by step S4 and can be represented as $MV_1$, $MV_2$, $MV_3$; and the basic motion vector of the target block is $MV_B$ which is not labeled in the figure.

The pixel values of the basic motion vector $MV_B$ in P frame and C frame are the first basic pixel value $MV_{Bp}$ and the second basic pixel value $MV_{Be}$, respectively; because there are additional motion vectors and the additional motion vectors point to two pixel values in the P frame and C frame, thus, the 6 reference pixel values corresponding to the 3 additional motion vectors can be obtained, includes: the pixel value of additional motion vector $MV_1$ in P frame, represented as $MV_{1p}$; the pixel value of additional motion vector $MV_1$ in C frame, represented as $MV_{1e}$; the pixel value of additional motion vector $MV_2$ in P frame, represented as $MV_{2p}$; the pixel value of additional motion vector $MV_2$ in C frame, represented as $MV_{2e}$; the pixel value of additional motion vector $MV_2$ in P frame, represented as $MV_{3p}$; the pixel value of additional motion vector $MV_3$ in C frame, represented as $MV_{3e}$.

The deviation amount can be represented as Diff, then the deviation amount corresponding to each of the 6 reference pixel values can be expressed as following Equation 4:

$$\text{Diff\_MV}_{1p}=\text{abs}(MV_{1p}-MV_{Bp})+\text{abs}(MV_{1p}-MV_{Be})$$

$$\text{Diff\_MV}_{1e}=\text{abs}(MV_{1e}-MV_{Bp})+\text{abs}(MV_{1e}-MV_{Be})$$

$$\text{Diff\_MV}_{2p}=\text{abs}(MV_{2p}-MV_{Bp})+\text{abs}(MV_{2p}-MV_{Be})$$

$$\text{Diff\_MV}_{2e}=\text{abs}(MV_{2e}-MV_{Bp})+\text{abs}(MV_{2e}-MV_{Be})$$

$$\text{Diff\_MV}_{3p}=\text{abs}(MV_{3p}-MV_{Bp})+\text{abs}(MV_{3p}-MV_{Be})$$

$$\text{Diff\_MV}_{3e}=\text{abs}(MV_{3e}-MV_{Bp})+\text{abs}(MV_{3e}-MV_{Be}) \quad \text{Equation 4}$$

The correlation is determined by comparing the relative magnitude of the 6 deviation amounts to a second predetermined threshold. Particularly, if the amount of deviation is less than the second predetermined threshold, it indicates that the reference pixel value has a strong correlation with the basic pixel value can be used as the target pixel value; if the amount of deviation is greater than or equal to the second predetermined threshold, it indicates the reference pixel value has a weak correlation with the basic pixel value can be discarded. The pixel value of the target block is obtained by averaging or taking the median value of the selected target pixel values.

It should be noted that if second predetermined threshold is too small which means a high pixel correlation requirement, fewer target pixel values can be selected, thus the process of averaging or taking the median value will be affected, if the second predetermined threshold is too large which means a low pixel correlation requirement, thus a distorted pixel value will be obtained. Accordingly, the second predetermined threshold is within a range of one-fifth to one-half of the first basic pixel value $MV_{Bp}$ (or the second basic pixel value $MV_{Be}$).

It should be noted that this is only a description of one specific implementation of obtaining the pixel value of the target block based on the basic motion vector and additional motion vector, and in other embodiments, other ways may be used to calculate the pixel value of the target block considering a combination of the basic motion vector and additional motion vector.

Figures 7A, 7B:
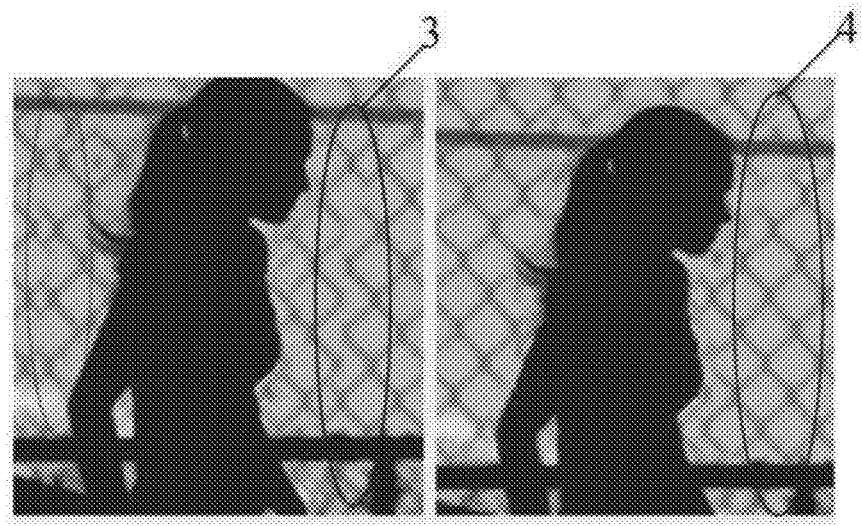
FIG. 7a and FIG. 7b are comparison diagrams of a motion compensation method based on an embodiment of the present disclosure.

Referring to FIG. 7a and FIG. 7b, a comparison between the motion compensation algorithm of the embodiment of the present disclosure that has not been performed and the motion compensation algorithm of the embodiment of the present disclosure that has been performed are illustrated respectively.

As shown in FIG. 7a, the elliptical box 3 is located at the edge of the moving portrait and there is a broken grid image. And in the elliptical box 4 shown in FIG. 7b, the grid at the edge of the moving portrait also retains the original continuous image of the grid lines without the phenomenon of broken grid lines, thus the present disclosure effectively improving the halo problem.

Figure 8:
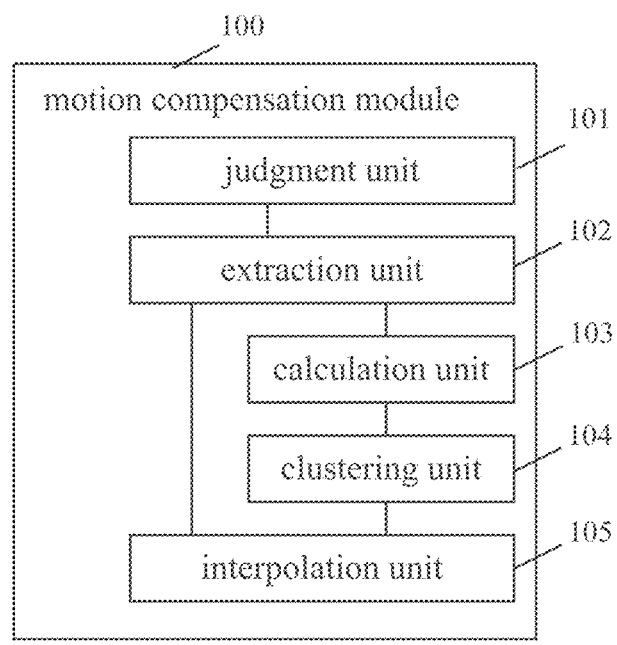
FIG. 8 is a functional block diagram of a motion compensation module based on an embodiment of the present disclosure.

In order to solve the described technical problems, embodiments of the present disclosure also provide a motion compensation module. FIG. 8 is a functional block diagram of a motion compensation module based on an embodiment of the present disclosure.

The motion compensation module 100 is configured to obtain the pixel values of the frames to be interpolated. The motion compensation module 100 includes:

a judgment unit 101, configured to determine whether a current block is located at a junction of a foreground and a background;

an extraction unit 102, configured to mark the current block as a target block, a motion vector of the target block being a basic motion vector, in response to a determination that the current block is located at the junction of the foreground and the background;

a calculation unit 103, configured to obtain a first set of motion vectors based on differences between motion vectors of a first central block of the target block pointing to a previous frame within a search range and the basic motion vector, and obtain a second set of motion vectors based on differences between motion vectors of a second central block of the target block pointing to a current frame within a search range and the basic motion vector;

clustering unit 104, configured to luster the first set of motion vectors and the second set of motion vectors to obtain an additional motion vector of the target block;

interpolation unit 105, configured to obtain a pixel value of the target block based on the basic motion vector and the additional motion vector.

The embodiment of the present disclosure provides a motion compensation module, which obtains motion vectors with large differences from the base motion vectors for the target blocks located at the background and foreground positions by a calculation unit, and obtains an additional motion vector by a clustering unit. Since the motion vectors of the background and the foreground in the junction area have large differences, the additional motion vector and the basic motion vector obtained based on the large difference can represent the background(or foreground) motion vector and foreground(or background) motion vector respectively, so that the pixel values obtained based on the additional motion vector and the basic motion vector by an interpolation unit, combined with the information of background and foreground, can more truly reflect the actual image pixel values, thus this disclosure can improve the problem that the edges of moving objects are prone to halo.

The following is a detailed description of this disclosure in conjunction with the functional block diagram of each unit.

It should be noted that the direction of movement of all pixels in a block located in the foreground or background area remains the same, therefore the blocks which are completely located in the foreground region or completely located in the background region also maintains the same motion vector as its neighboring surrounding blocks. A block located at a junction position of a foreground region or a background region, the motion vector in which includes the foreground motion vector and the background motion vector therefore the surrounding blocks adjacent to the blocks located at a junction position of a foreground region or a background region, have different motion vectors. For example, some of the surrounding blocks are background motion vectors; other blocks are foreground motion vectors with large differences.

Based on this feature, as shown in FIG. 8, the judgment unit 101 is configured to obtain a motion vector of the current block, and determine whether motion vectors of the surrounding blocks centered on the current block are the same as the motion vector of the current block, and, in response to a determination that a motion vector of a surrounding block is different from the motion vector of the current block, determining that the current block is located at the junction of foreground and background.

Specifically, the current block refers to the block that needs to be determined in a frame to be interpolated, and the motion vector refers to the motion vector of a previous frame (P frame) to a current frame (C frame). Motion estimation is performed before motion compensation is performed, a video chip may include a motion estimation module for providing motion vectors, from which the motion vector described can be obtained in practical applications.

The judgment unit 101 is also configured to whether motion vectors of surrounding blocks centered on the current block are the same as the motion vector of the current block.

In practical application, the current block can be taken as the center, and the motion vectors in the range of 3×3 can be analyzed. Specifically, there are 9 blocks in the range of 3×3, the motion vector of the current block can be taken as a reference, determining the similarities and differences between the motion vectors of the surrounding 8 blocks and the motion vector of the current block.

The judgment unit 101 is also configured to in response to a determination that a motion vector of a surrounding block is different from the motion vector of the current block, determining that the current block is located at the junction of foreground and background.

For example, if 5 of the 8 surrounding blocks have the same motion vector as the current block, and 3 blocks have a different motion vector than the current block, it means that these 3 blocks and the current block are in different background or foreground region. It is determined that the current block is located at a junction of the background and foreground, and the pixels in the current block have multiple motion vectors.

And if the motion vector of the surrounding block is consistent with the motion vector of the current block, it means that the current block is in a relatively flat region with little change, it can be determined that the current block is completely located in the foreground region or completely located in the background region.

The extraction unit 102 is configured to n response to a determination that the current block is located at the junction of the foreground and the background, marking the current block as a target block, a motion vector of the target block being a basic motion vector.

The extraction unit 102 is used for used for marking the block located at the junction as a target block based on the judgment unit 101, so as to perform the motion compensation, and mark the motion vector of P frame to C frame of the target block as a basic motion vector, which serves as a reference for performing follow-up motion vector comparison.

Figure 9:
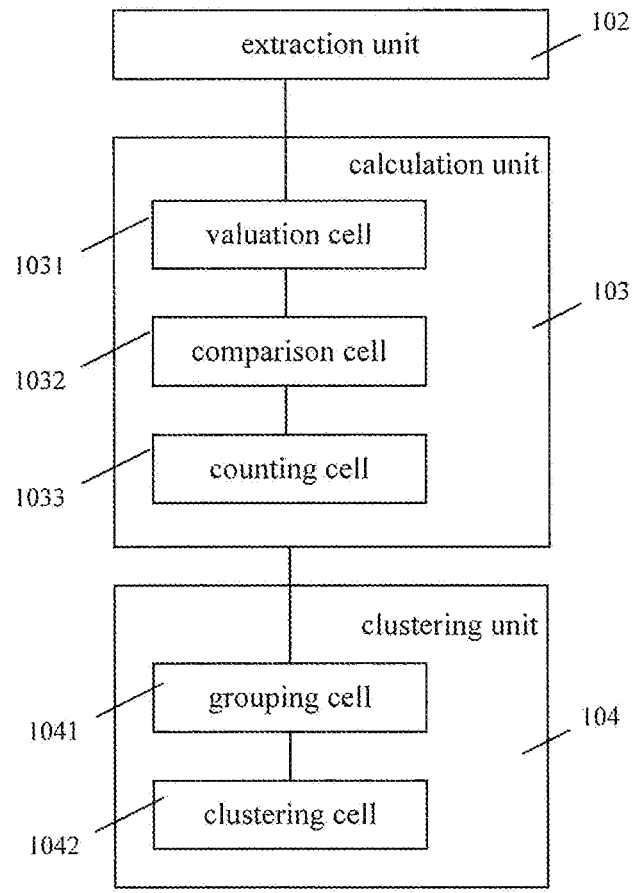
FIG. 9 is a functional block diagram of the computing unit and the clustering unit of FIG. 8.

FIG. 9 is a functional block diagram of the calculation unit and the clustering unit of FIG. 8.

The calculation unit 103 includes.

a valuation cell 1031, configured to take a block in the previous frame which basic motion vector of the target block points to as the first central block; and obtain motion vectors of a plurality of first surrounding blocks of the first central block within the search range; and configure to define a block in the current frame which basic motion vector of the target block points to as the second central block; and obtain motion vectors of a plurality of second surrounding blocks of the second central block within the search range;

a comparison cell 1032, configured to determine whether differences between the motion vectors of the plurality of the second surrounding blocks and the basic motion vector are greater than a first predetermined threshold;

a counting cell 1033, configured to classify the motion vector of the one of the plurality of the first surrounding blocks into the first set of motion vectors in response to a determination that a difference between a motion vector of one of the plurality of the first surrounding blocks and the basic motion vector is greater than a first predetermined threshold, and configured to classify, the motion vector of the one of the plurality of the second surrounding blocks into the second set of motion vectors in response to a determination that a difference between a motion vector of one of the plurality of the second surrounding blocks and the basic motion vector is greater than a first predetermined threshold.

Specifically, the process of obtaining the first set of motion vectors by the calculation unit 103 is illustrated with reference to FIG. 5, which shows a schematic representation of each motion vector of the target block to be interpolated in a search range pointing to the previous frame.

In the FIG. 5, the target block B of the frame to be interpolated corresponds to the first central block $B_p$ in P frame based on the basic motion vector $MV_B$, and the target block B is located at the junction of background and foreground, accordingly, the first central block $B_p$ in P frame is also located at the junction of the background and foreground. The differences between the motion vectors of the 8 first surrounding blocks $B_{p1}$, $B_{p2}$, . . . and the basic motion vector are shown here with the first central block as the center in a search range of 3×3.

Specifically, the valuation cell 1031 is used to obtain the motion vectors of the 8 first surrounding blocks $B_{p1}$, $B_{p2}$ . . . around the first central block $B_p$, and the comparison cell 1032 is used to determine whether the difference between the surrounding 8 motion vector $MV_p$ and the basic motion vector $MV_B$ is greater than a first predetermined threshold; the counting cell 1033 is used to group the motion vectors of the first surrounding block into the first set of motion vectors, In response to a determination that the difference is greater than the first predetermined.

Specifically, the process of obtaining the first set of motion vectors can be expressed by following Equation 1:

$$MV_p^{'} =$$

-continued $$\{MV \mid MV_p(row_p + i_p, col_p + j_p) - MV_B > thrd, i_p, j_p \in \left[-\frac{w}{2}, \frac{w}{2}\right]\}$$

wherein, $MV'_p$ represents each motion vector in the first set of motion vectors, w×w represents the search range, $(row_p, col_p)$ represents position of the first central block in the previous frame, $i_p$ and $j_p$ represents the offset position of the first surrounding block relative to the first central block, $MV_B$ represents the basic motion vector, thrd represents the first predetermined threshold.

It should also be noted that because the motion vector is directional, projected onto the XY coordinate system in the plane of the P frame, the difference between $MV_p$ and $MV_B$ can actually be expressed as abs $(MV_{px}-MV_{Bx})$+abs $(MV_{py}-MV_{By})$, wherein abs means absolute value.

Similar to the method of searching and determining in P frames, the target block B corresponds to the second central block $B_e$ in C frame based on the basic motion vector $MV_B$, and the target block B is located at a junction of a background and a foreground, accordingly, the second central $B_p$, in C frame is also located at the junction of the background and foreground. For example, the second central block $B_p$ can be taken as the center in a search range of 3×3, the differences between the motion vectors of the 8 second surrounding blocks and the basic motion vector can be obtained.

Specifically, the valuation cell 1031 can be configured to obtain the motion vectors of 8 second surrounding blocks around the second central block $B_e$ and obtain the difference between the surrounding 8 motion vector and the basic motion vector $MV_B$. Comparison cell 1032 can be configured to determine whether the difference is greater than the first predetermined threshold. The counting cell 1033 can be configured to group the motion vectors of the second surrounding blocks into the second set of motion vectors, in response to a determination that the difference is greater than the first predetermined threshold.

Specifically, the process of obtaining the second set of motion vectors can be expressed by following Equation 2:

$$MV'_c = \{MV \mid MV_c(row_c + i_c, col_c + j_c) - MV_B > thrd, i_c, j_c \in \left[-\frac{w}{2}, \frac{w}{2}\right]\}$$

wherein, $MV'_e$ represents each motion vector in the second set of motion vectors, $(row_e, col_e)$ represents position of the second central block in the current frame, $i_e$ and $j_e$ represents the offset position of the second surrounding block relative to the second central block.

It should also be noted that because the motion vector is directional, projected onto the XY coordinate system in the plane of the C frame, the difference between $MV_e$ and $MV_B$ can actually be expressed as abs $(MV_{ex}-MV_{Bx})$+abs $(MV_{ey}-MV_{By})$, wherein abs means absolute value.

It should be noted that FIG. 5 shows an example of a search in a 3×3 range; accordingly, the w of the search range in the Equation 1 and Equation 2 is set to 3, and the value of $i_p$ and $j_p$ is taken in the range of 1, 0 and +1, after taken as an integer. In other embodiments, it is also possible to set the value of the w based on the size of the block, and the requirements of accuracy, for example, the w can also be set to 5, 7, etc.

The embodiment of the present disclosure selects the motion vectors that are significantly different from the basic motion vector by comparing them with the first predetermined threshold. The motion vectors selected and the basic motion vector represents the background motion vector and the foreground motion vector, respectively.

It should be noted that if the first predetermined threshold is too small, it is difficult to distinguish between background motion vectors and foreground motion vectors, and if the first preset threshold is too large, fewer motion vectors will be selected, which is not favorable for subsequent interpolation to obtain pixel values using a mean or a median algorithm. Thus, in this embodiment, the first predetermined threshold within the range of one-third of the basic motion vector to two-thirds of the basic motion vector.

In combination with reference to FIG. 9, the motion compensation module 100 further includes: a clustering unit 104, configured to cluster the first set of motion vectors and the second set of motion vectors to obtain an additional motion vector of the target block.

The additional motion vectors can be obtained by clustering the motion vectors of the first set of motion vectors and the second set of motion vectors, and the first set of motion vectors and the second set of motion vectors include the motion vectors which have larger differences with the basic motion vector, therefore, the additional motion vector is a typical motion vector with a larger difference from a basic motion vector. By making the blocks at the junction of foreground and background have multiple motion vectors (for example, basic motion vectors and additional motion vectors), it is possible to reflect the different motions of foreground pixels and background pixels.

In addition, the motion compensation module 100 of this present disclosure can obtain the motion vector with the larger difference from the basic motion vector by the calculation unit 103, and obtains typical motion vectors as representatives for subsequent pixel value calculation through the clustering unit 104, which can reduce the computational volume of data processing and improve the response speed of video image processing.

Specifically, the clustering unit 104 includes a grouping cell 1041 and a clustering cell 1042. The grouping cell 1041 is configured to divide the first set of motion vectors and the second set of motion vectors into a plurality of groups based on the variabilities of the motion vectors; and the clustering cell 1042 is configured to take a mean value of the motion vectors or a median value of the motion vectors in each group as the additional motion vector The grouping cell 1041 can execute grouping by the following ways. For example, the first set of motion vectors $MV'_p$ and the second set of motion vectors $MV'_e$ have multiple motion vectors. Any motion vector can be taken as an initial motion vector of a first group. And the difference between the other motion vector and the initial motion vector can be obtained; if the difference is larger, the other motion vector will be grouped into a new group; if the difference is smaller, the other motion vector will be grouped into the same group as the initial motion vector. And so on, after polling the motion vectors in the two sets of motion vectors once, motion vector grouping is realized. Wherein, the difference can be set based on empirical values.

The clustering cell 1042 is coupling to the grouping cell 1041, and is configured to take one motion vector as the additional motion vector if there is only one motion vector in a group; and is configured to take a mean or a median of the multiple motion vectors as the additional motion vector if there are multiple motion vectors in a group.

Specifically, the process of obtaining the additional motion vectors by averaging, which is executed by the clustering cell 1042, can be expressed by the following Equation 3.

$$MV_1 = \left(\sum_{k=1}^{m_1} \Omega_1\right) / m_1$$

$$MV_2 = \left(\sum_{k=1}^{m_2} \Omega_2\right) / m_2$$

$$MV_n = \left(\sum_{k=1}^{m_n} \Omega_1\right) / m_n$$

$$\{\Omega_1 \cup \Omega_2 \wedge \Omega_n\} = \{MV'_p \cup MV'_c\}$$

Equation 3 wherein n represents the number of groups after grouping, $m_1$ represents the number of motion vectors in the ith group after grouping ((i is in the range of 1 to n), Σ represents summation of motion vectors, wherein $\Omega_1$, $\Omega_2$, ..., $\Omega_n$ represents the set of motion vectors of each group respectively.

In other embodiments, an intermediate value of the motion vector in any group can also be taken as an additional motion vector by the clustering cell 1042, i.e., the additional motion vector is obtained by the median value.

Figure 10:
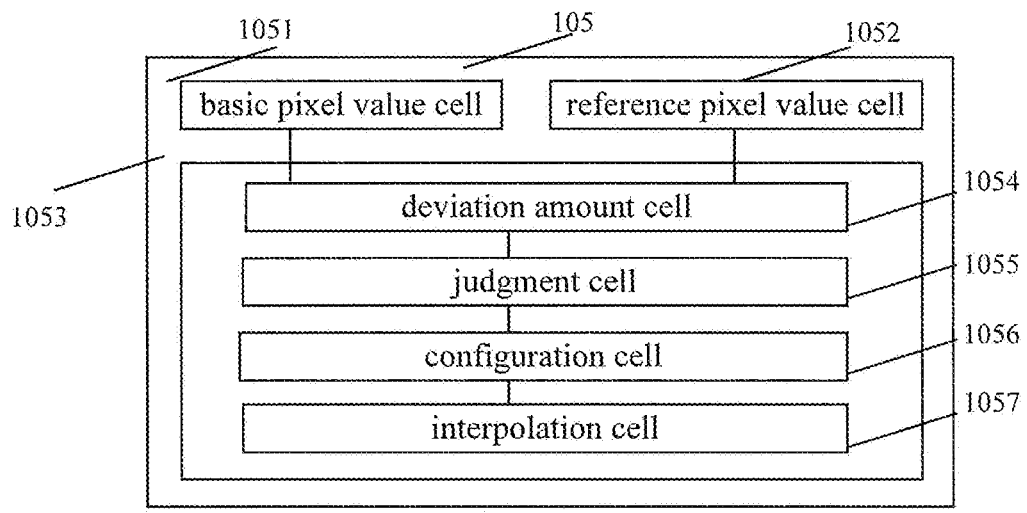
FIG. 10 is a functional block diagram of the interpolation unit of FIG. 8.

FIG. 10 is a functional block diagram of the interpolation unit of FIG. 8. The interpolation unit 105 is configured to obtain the pixel value of the target block based on the basic motion vector and the additional motion vector.

Based on the basic motion vector obtained from the motion estimation, an additional motion vector to the block located at the junction of foreground and background can be added to represent a motion vector different from the basic motion vector, and the pixel values of the frames to be interpolated, which can be obtained by interpolating a block with multiple motion vectors, can provide a more realistic image reproduction.

It should be noted that the interpolation unit 105 of the disclosure is based on the feature that the pixel values of the same pixels in adjacent frames are correlated.

Specifically, the interpolation unit 105 includes:

a basic pixel value cell 1051, configured to obtain the pixel value of the basic motion vector in the previous frame as a first basic pixel value and the pixel value of the basic motion vector in the current frame as a second basic pixel value:

a reference pixel value cell 1052, configured to obtain the pixel values of the additional motion vector in the previous frame and the current frame as reference pixel value;

a target pixel value cell 1053, configure to obtain a pixel value of the target block based on a pixel value of the reference pixel value that has a correlation with the basic pixel value.

Accordingly, the target pixel value cells 1053 further includes.

a deviation amount cell 1054, configured to, for each reference pixel value, calculate a first difference between the reference pixel value and the first basic pixel value, and calculate a second difference between the reference pixel value and the second base pixel value; and calculate a sum of the first difference and second difference as a deviation amount;

a judgment cell 1055, configured to determine whether the deviation amount corresponding to the reference pixel value for each additional motion vector is less than a second predetermined threshold;

a configuration cell 1056, configured to define the reference pixel value as a target pixel value if the deviation amount is less than the second predetermined threshold;

an interpolation cell 1057, configured to take the mean the target pixel or median of the target pixel value as the pixel value of the target block In combination with reference to FIG. 6, the process of obtaining pixel values by the interpolation unit 105 is illustrated. As shown in FIG. 6, in this embodiment, 3 additional motion vectors can be obtained by step S4 and can be represented as $MV_1$, $MV_2$, $MV_3$; and the basic motion vector of the target block is $MV_B$ which is not labeled in the figure.

The pixel values of the basic motion vector $MV_B$ in P frame and C frame are the first basic pixel value $MV_{Bp}$ and the second basic pixel value $MV_{Be}$, respectively; because there are additional motion vectors and the additional motion vectors point to two pixel values in the P frame and C frame, thus, the 6 reference pixel values corresponding to the 3 additional motion vectors can be obtained, includes: the pixel value of additional motion vector $MV_1$ in P frame, represented as $MV_{1p}$; the pixel value of additional motion vector $MV_1$ in C frame, represented as $MV_{1e}$; the pixel value of additional motion vector $MV_2$ in P frame, represented as $MV_{2p}$; the pixel value of additional motion vector $MV_2$ in C frame, represented as $MV_{2e}$; the pixel value of additional motion vector $MV_3$ in P frame, represented as $MV_{3p}$; the pixel value of additional motion vector $MV_3$ in C frame, represented as $MV_{3ev}$.

The deviation amount can be represented as Diff, then the deviation amount corresponding to each of the 6 reference pixel values can be expressed as following Equation 4:

$$\text{Diff\_MV}_{1p} = \text{abs}(MV_{1p} - MV_{Bp}) + \text{abs}(MV_{1p} - MV_{Be})$$

$$\text{Diff\_MV}_{1e} = \text{abs}(MV_{1e} - MV_{Bp}) + \text{abs}(MV_{1e} - MV_{Be})$$

$$\text{Diff\_MV}_{2p} = \text{abs}(MV_{2p} - MV_{Bp}) + \text{abs}(MV_{2p} - MV_{Be})$$

$$\text{Diff\_MV}_{2e} = \text{abs}(MV_{2e} - MV_{Bp}) + \text{abs}(MV_{2e} - MV_{Be})$$

$$\text{Diff\_MV}_{3p} = \text{abs}(MV_{3p} - MV_{Bp}) + \text{abs}(MV_{3p} - MV_{Be})$$

$$\text{Diff\_MV}_{3e} = \text{abs}(MV_{3e} - MV_{Bp}) + \text{abs}(MV_{3e} - MV_{Be})$$

Equation 4

The correlation is determined by comparing the relative magnitude of the 6 deviation amounts to a second predetermined threshold by the judgment cell 1055. Particularly, if the amount of deviation is less than the second predetermined threshold, it indicates that the reference pixel value has a strong correlation with the basic pixel value can be used as the target pixel value; if the amount of deviation is greater than or equal to the second predetermined threshold, it indicates the reference pixel value has a weak correlation with the basic pixel value can be discarded. The pixel value of the target block is obtained by averaging or taking the median value of the selected target pixel values.

The interpolation cell 1057 is to obtain the pixel value of the target block by averaging or taking the median value of target pixel values, which are selected by the configuration cell 1056.

It should be noted that if second predetermined threshold is too small which means a high pixel correlation requirement, fewer target pixel values can be selected, thus the process of averaging or taking the median value will be affected; if the second predetermined threshold is too large which means a low pixel correlation requirement, thus a distorted pixel value will be obtained. Accordingly, the second predetermined threshold is within a range of one-fifth to one-half of the first basic pixel value $MV_{Bp}$ (or the second basic pixel value $MV_{Be}$).

It should be noted that this is only a description of one specific implementation of obtaining the pixel value of the target block based on the basic motion vector and additional motion vector, and in other embodiments, other ways may be used to calculate the pixel value of the target block considering a combination of the basic motion vector and additional motion vector.

Figure 11:
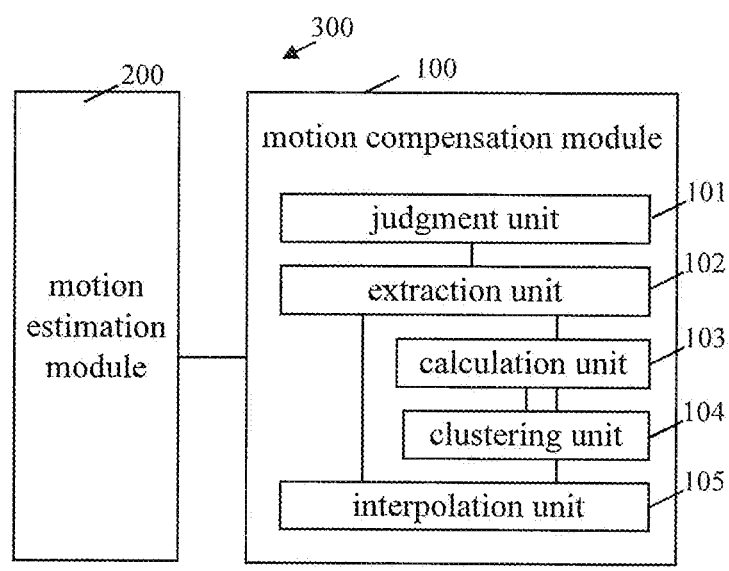
FIG. 11 is a functional block diagram of a chip based on an embodiment of the present disclosure.

Accordingly, embodiments of the present disclosure also provide a chip FIG. 11 is a functional block diagram of a chip based on an embodiment of the present disclosure. The chip 300 includes:

a motion estimation module 200, is configured to provide a motion vector.

a motion compensation module 100, provide by this present disclosure, which is configured to add additional motion vectors to the blocks located at the junction of background and foreground, based on the motion vectors provided by the motion estimation module 200, and interpolate the frames by combining the additional motion vectors and the motion vectors provided by the motion estimation module 200 to achieve motion compensation and thus improve the halo problem.

Accordingly, Embodiments of the present disclosure also provide an electronic device including the chip provided by this disclosure.

The electronic device is a set-top box, a television, a projector or a cell phone. The video image output from the electronic device is not prone to breakage or blurring at the edge position of moving objects, improving the halo problem.

Accordingly, embodiments of the present disclosure also provide a storage medium stores one or more computer instructions, which is configure to implement the motion compensation method provided by this disclosure.

The storage medium is a computer-readable storage medium, the storage medium can be Read-Only Memory (ROM), Random Access Memory (RAM), U disk, mobile hard disk, disk or CD-ROM and other media that can store the program code.

Embodiments of the present disclosure may be implemented by various means such as hardware, firmware, software, or combinations thereof. In hardware configuration means, the methods based on exemplary embodiments of the present disclosure may be implemented by one or more specialized integrated circuits (ASICs), digital signal processors (DSPs), digital signal processor devices (DSPDs), programmable logic devices (PLDs), field programmable gate arrays (FPGAs), processors, controllers, microcontrollers, microprocessors, etc.

In a firmware or software configuration approach, implementations of the disclosure may be implemented in the form of modules, processes, functions, etc. The software code may be stored in a memory unit and executed by the processor. The memory unit is located inside or outside the processor and can send data to and receive data from the processor by various known means.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A motion compensation method, comprising:
    determining whether a current block is located at a junction of a foreground and a background;
    in response to a determination that the current block is located at the junction of the foreground and the background, marking the current block as a target block, a motion vector of the target block being a basic motion vector;
    obtaining a first set of motion vectors based on differences between motion vectors of a first central block of the target block pointing to a previous frame within a search range and the basic motion vector;
    obtaining a second set of motion vectors based on differences between motion vectors of a second central block of the target block pointing to a current frame within a search range and the basic motion vector;
    clustering the first set of motion vectors and the second set of motion vectors to obtain an additional motion vector of the target block;
    obtaining a pixel value of the target block based on the basic motion vector and the additional motion vector;
    wherein obtaining the first set of motion vectors comprises:
        taking a block in the previous frame which basic motion vector of the target block points to as the first central block;
        obtaining motion vectors of a plurality of first surrounding blocks of the first central block within the search range;
        determining whether differences between the motion vectors of the plurality of the first surrounding blocks and the basic motion vector are greater than a first predetermined threshold;
        in response to a determination that a difference between a motion vector of one of the plurality of the first surrounding blocks and the basic motion vector is greater than a first predetermined threshold, classifying the motion vector of the one of the plurality of the first surrounding blocks into the first set of motion vectors; and
    obtaining the second set of motion vectors comprises:
        defining a block in the current frame which basic motion vector of the target block points to as the second central block;
        obtaining motion vectors of a plurality of second surrounding blocks of the second central block within the search range;
        determining whether differences between the motion vectors of the plurality of the second surrounding blocks and the basic motion vector are greater than a first predetermined threshold; and
        in response to a determination that a difference between a motion vector of one of the plurality of the second surrounding blocks and the basic motion vector is greater than a first predetermined threshold, classifying the motion vector of the one of the plurality of the second surrounding blocks into the second set of motion vectors.

2. The method of claim 1, wherein the first predetermined threshold is within a range of one-third of the basic motion vector to two-thirds of the basic motion vector.

3. The method of claim 1, wherein obtaining the pixel value of the target block based on the basic motion vector and the additional motion vector comprises:
  obtaining the pixel value of the basic motion vector in the previous frame as a first basic pixel value and the pixel value of the basic motion vector in the current frame as a second basic pixel value;
  obtaining the pixel values of the additional motion vector in the previous frame and the current frame as reference pixel values;
  obtaining a pixel value of the target block based on a pixel value of the reference pixel values that has a correlation with the basic pixel value.

4. The method of claim 3, wherein obtaining the pixel value of the target block based on the pixel value of the reference pixel values that has a correlation with the basic pixel value comprises:
  for each reference pixel value,
    calculating a first difference between the reference pixel value and the first basic pixel value, and a second difference between the reference pixel value and the second base pixel value;
    calculating a sum of the first difference and second difference as a deviation amount;
    determining whether the deviation amount corresponding to the reference pixel value is less than a second predetermined threshold; and
    in response to the deviation amount being less than the second predetermined threshold, taking the reference pixel value as a target pixel value;
  for each additional motion vector, taking a mean or a median value of the target pixel values as the pixel value of the target block.

5. The method of claim 4, wherein the second predetermined threshold is within a range of one-fifth to one-half of the first basic pixel value, or, the second predetermined threshold is within a range of one-fifth to one-half of the second basic pixel value.

6. The method of claim 1, wherein clustering the first set of motion vectors and the second set of motion vectors to obtain the additional motion vector of the target block comprises:
  dividing the first set of motion vectors and the second set of motion vectors into a plurality of groups based on variabilities of the motion vectors;
  taking a mean value of the motion vectors or a median value of the motion vectors in each group as the additional motion vector.

7. The method of claim 1, wherein determining whether the current block is located at the junction of the foreground and the background comprises:
  obtaining a motion vector of the current block;
  determining whether motion vectors of surrounding blocks centered on the current block are the same as the motion vector of the current block;
  in response to a determination that a motion vector of a surrounding block is different from the motion vector of the current block, determining that the current block is located at the junction of foreground and background.

8. A chip, comprising a motion compensation module, the motion compensation module comprising:
  a judgment unit, configured to determine whether a current block is located at a junction of a foreground and a background;
  an extraction unit, configured to mark the current block as a target block, a motion vector of the target block being a basic motion vector, in response to a determination that the current block is located at the junction of the foreground and the background;
  a calculation unit, configured to:
    (i) obtain a first set of motion vectors based on differences between motion vectors of a first central block of the target block pointing to a previous frame within a search range and the basic motion vector; and
    (ii) obtain a second set of motion vectors based on differences between motion vectors of a second central block of the target block pointing to a current frame within a search range and the basic motion vector;
  a clustering unit, configured to cluster the first set of motion vectors and the second set of motion vectors to obtain an additional motion vector of the target block; and
  an interpolation unit, configured to obtain a pixel value of the target block based on the basic motion vector and the additional motion vector;
  wherein the calculation unit further comprises:
    a valuation cell, configured to take a block in the previous frame which basic motion vector of the target block points to as the first central block; and obtain motion vectors of a plurality of first surrounding blocks of the first central block within the search range; and configure to define a block in the current frame which basic motion vector of the target block points to as the second central block; and obtain motion vectors of a plurality of second surrounding blocks of the second central block within the search range;
    a comparison cell, configured to determine whether differences between the motion vectors of the plurality of the second surrounding blocks and the basic motion vector are greater than a first predetermined threshold; and
    a counting cell, configured to classify the motion vector of the one of the plurality of the first surrounding blocks into the first set of motion vectors in response to a determination that a difference between a motion vector of one of the plurality of the first surrounding blocks and the basic motion vector is greater than a first predetermined threshold, and configured to classify the motion vector of the one of the plurality of the second surrounding blocks into the second set of motion vectors in response to a determination that a difference between a motion vector of one of the plurality of the second surrounding blocks and the basic motion vector is greater than a first predetermined threshold.

9. The chip of claim 8, the first predetermined threshold is within a range of one-third of the basic motion vector to two-thirds of the basic motion vector.

10. The chip of claim 8, wherein the interpolation unit further comprises:
  a basic pixel value cell, configured to obtain the pixel value of the basic motion vector in the previous frame as a first basic pixel value and the pixel value of the basic motion vector in the current frame as a second basic pixel value;
  a reference pixel value cell, configured to obtain the pixel values of the additional motion vector in the previous frame and the current frame as reference pixel value;

a target pixel value cell, configured to obtain a pixel value of the target block based on a pixel value of the reference pixel value that has a correlation with the basic pixel value.

11. The chip of claim 10, wherein the target pixel value cell further comprises:
a deviation amount cell, configured to, for each reference pixel value, calculate a first difference between the reference pixel value and the first basic pixel value, and calculate a second difference between the reference pixel value and the second base pixel value; and calculate a sum of the first difference and second difference as a deviation amount;
a judgment cell, configured to determine whether the deviation amount corresponding to the reference pixel value is less than a second predetermined threshold;
a configuration cell, configured to take the reference pixel value as a target pixel value in response to the deviation amount being less than the second predetermined threshold;
an interpolation cell, configured to take a mean or a median of the target pixel values as the pixel value of the target block.

12. The chip of claim 11, wherein the second predetermined threshold is within a range of one-fifth to one-half of the first basic pixel value.

13. The chip of claim 11, wherein the second predetermined threshold is within a range of one-fifth to one-half of the second basic pixel value.

14. The chip of claim 8, wherein the clustering unit further comprises:
a grouping cell, configured to divide the first set of motion vectors and the second set of motion vectors into a plurality of groups based on the variabilities of the motion vectors;
a clustering cell, configured to take a mean value of the motion vectors or a median value of the motion vectors in each group as the additional motion vector.

15. The chip of claim 8, wherein the judgment unit is configured to:
obtain a motion vector of the current block,
determine whether motion vectors of the surrounding blocks centered on the current block are the same as the motion vector of the current block, and
in response to a determination that a motion vector of a surrounding block is different from the motion vector of the current block, determine that the current block is located at the junction of foreground and background.

16. The chip of claim 8, wherein the chip further comprises: a motion estimation module, configured to provide a motion vector to the motion compensation module.

17. An electronic device, wherein the electronic device is a set-top box, a television, a projector, or a cell phone, and wherein the electronic device comprises the chip of claim 8.

* * * * *